United States Patent
Takayasu et al.

(10) Patent No.: US 6,723,226 B1
(45) Date of Patent: Apr. 20, 2004

(54) METHOD AND APPARATUS FOR FORMING ELECTROLYTIC WATER AND APPARATUS FOR WASHING SEMICONDUCTOR SUBSTRATE USING ELECTROLYTIC WATER-FORMING APPARATUS

(75) Inventors: Jun Takayasu, Kawasaki (JP); Naoto Miyashita, Yokohama (JP); Mikiko Kawaguchi, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 08/631,226

(22) Filed: Apr. 12, 1996

(30) Foreign Application Priority Data

Apr. 15, 1995 (JP) ............................................. 7-113996

(51) Int. Cl.$^7$ ................................................ C02F 1/461
(52) U.S. Cl. ...................... 205/746; 205/747; 205/751; 204/263; 134/902
(58) Field of Search .................. 205/746, 747, 205/751; 204/263; 134/902

(56) References Cited

U.S. PATENT DOCUMENTS

| | | | |
|---|---|---|---|
| 5,445,722 A | * | 8/1995 | Yamaguti et al. ............ 204/229 |
| 5,543,030 A | * | 8/1996 | Shiramizu et al. ........... 205/464 |
| 5,578,193 A | * | 11/1996 | Aoki et al. ................... 205/746 |
| 5,593,554 A | * | 1/1997 | Yamanaka et al. ........... 205/252 |

FOREIGN PATENT DOCUMENTS

JP    6-260480    9/1994

* cited by examiner

*Primary Examiner*—Arun S. Phasge
(74) *Attorney, Agent, or Firm*—Finnegan, Henderson, Farabow, Garrett & Dunner, L.L.P.

(57) ABSTRACT

In forming an electrolytic water, pure water or ultra-pure water is added to at least one solid supporting electrolyte selected from the group consisting of oxalic acid, ammonium oxalate, ammonium formate, ammonium bicarbonate, and ammonium tartrate to prepare a solution saturated with the supporting electrolyte. The solution containing the supporting electrolyte is subjected to hydrolysis to obtain an anodic water and a cathodic water.

8 Claims, 3 Drawing Sheets

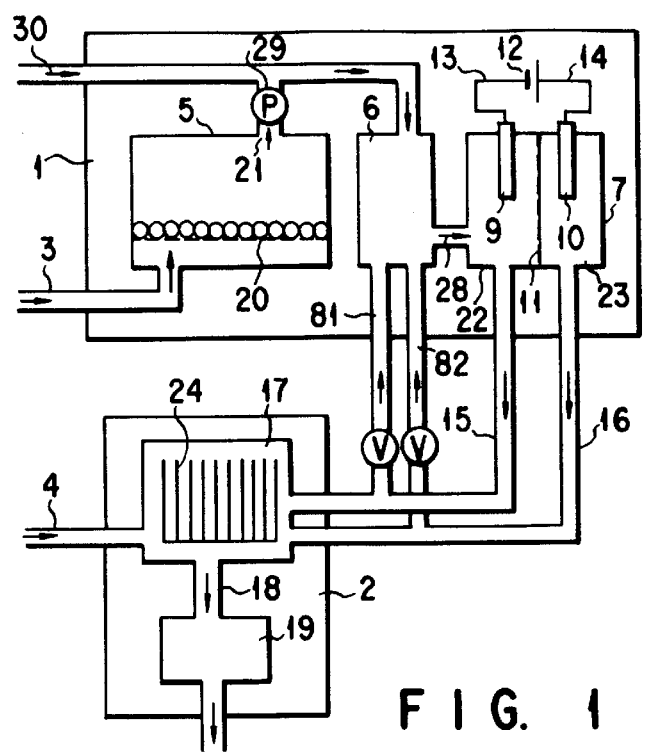
F I G. 1
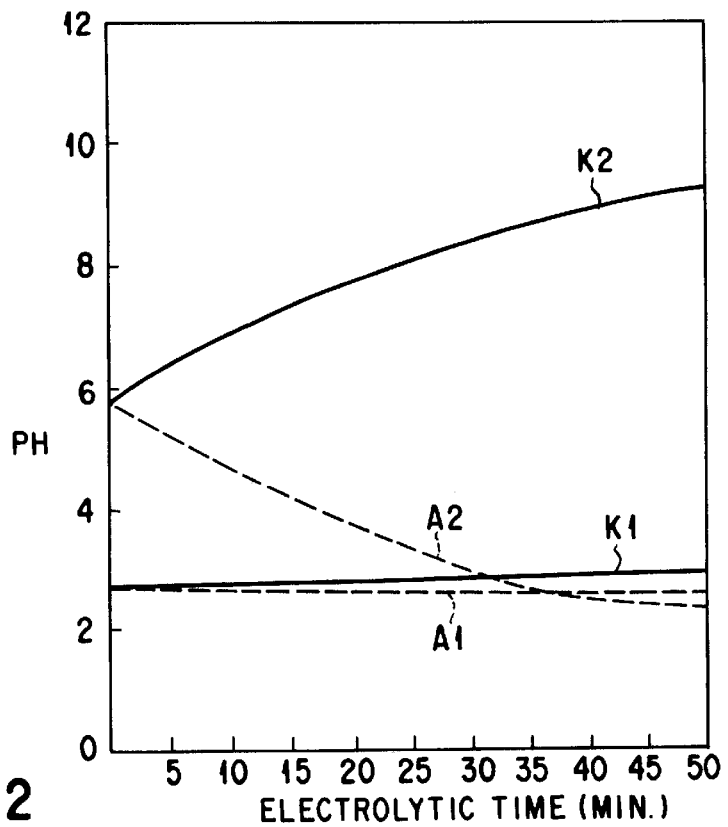
F I G. 2

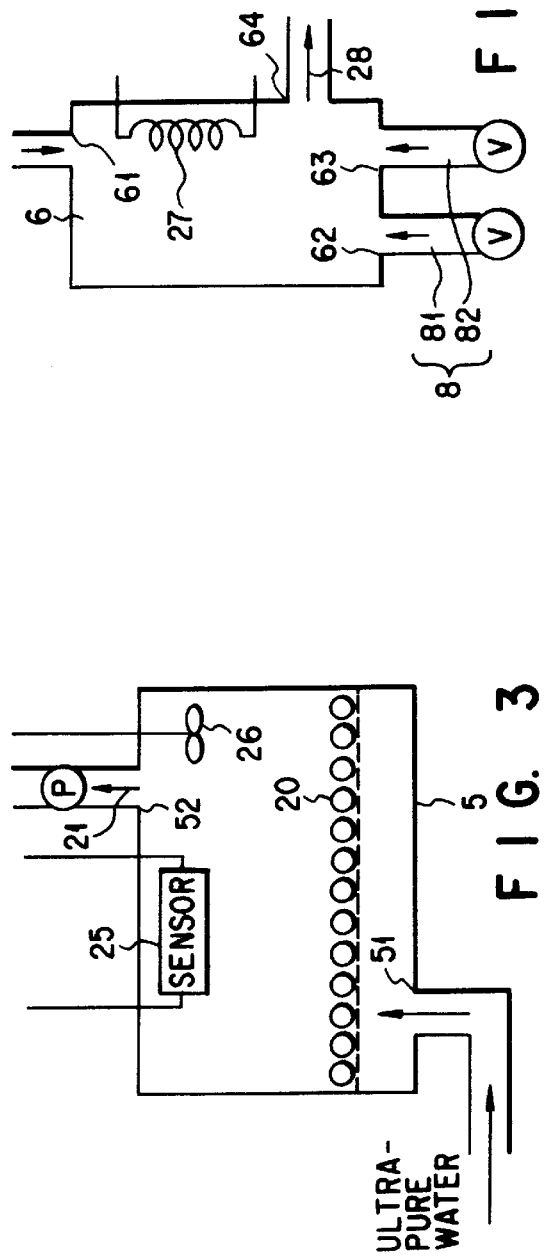
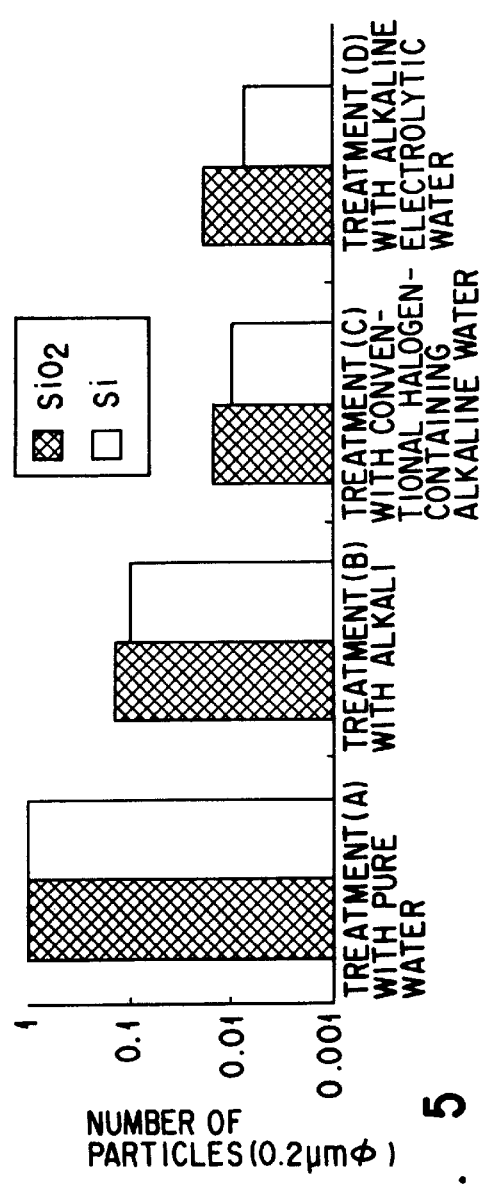
FIG. 3
FIG. 4
FIG. 5

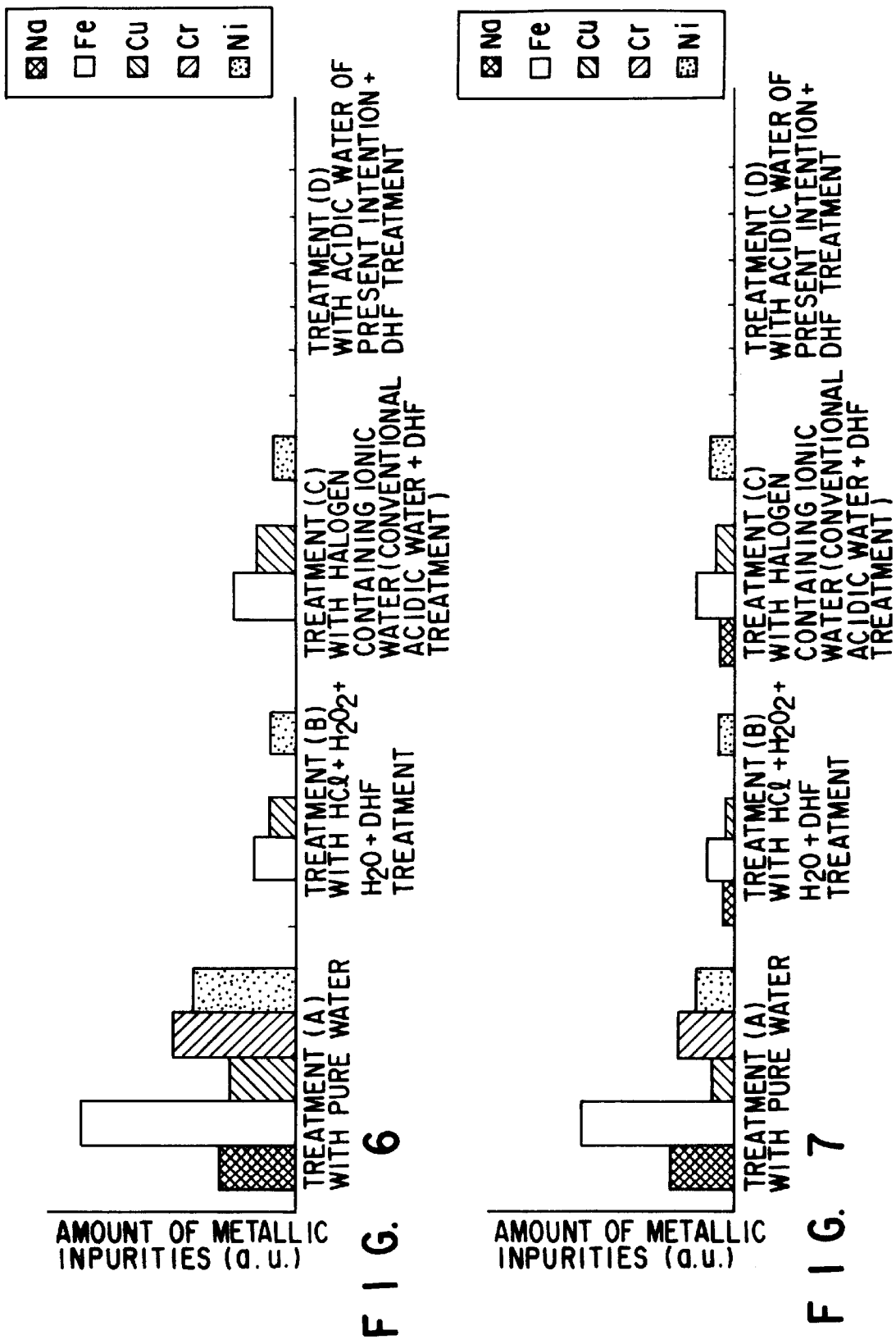

2. Description of the Related Art

METHOD AND APPARATUS FOR FORMING ELECTROLYTIC WATER AND APPARATUS FOR WASHING SEMICONDUCTOR SUBSTRATE USING ELECTROLYTIC WATER-FORMING APPARATUS

BACKGROUND OF THE INVENTION

1. Field of the Invention

The present invention relates to a method and apparatus for forming an electrolytic water and an apparatus for washing semiconductor wafers using an electrolytic water-forming apparatus.

2. Description of the Related Art

It was customary in the past to use fluorine-based solvents such as freon in the manufacture of semiconductor devices. However, since the fluorine-based solvents give detrimental effects to living environments, water such as a pure water and ultra-pure water has come to be used as a safe solvent in place of the fluorine-based solvents.

The pure water is substantially free from impurities such as ions, fine particles, microorganisms and organic substances and exhibits such a high resistivity as 5 to 18 MΩ·cm. The ultra-pure water, which is prepared by using an ultra-pure water manufacturing apparatus, is prepared by removing with a high efficiency the substances which are suspended or dissolved in water, and has a purity higher than that of the pure water.

In terms of the electrical conductivity, the pure water has a conductivity ρ lower than 10 µScm. On the other hand, the ultra-pure water has a conductivity ρ lower than 0.055 µScm. If the pure water or the ultra-pure water is electrolyzed, produced are an anodic water containing substances exhibiting a strong oxidizing power such as oxygen and ozone and a cathodic water exhibiting a strong reducing power.

In the manufacture of a semiconductor device, a surface of a semiconductor substrate is washed with, for example, an anodic water or a cathodic water.

In the conventional method of manufacturing a semiconductor device, a surface of a silicon semiconductor substrate is etched in a small amount to remove particles, and a pH value of the etching solution is controlled to remove metallic contaminants, followed by washing the substrate with an ultra-pure water until the resistivity of the ultra-pure water is recovered to about 18 MΩ·cm. The oxidizing/reducing properties of the washing water are affected by the substances contained therein. It should be noted that oxygen is dissolved in the pure or ultra-pure water. However, if a silicon semiconductor substrate is washed wish such a pure water, the substrate is partially oxidized by the dissolved oxygen. To overcome the difficulty, it was customary to diminish the amount of oxygen dissolved in the washing water.

The diameter of a semiconductor wafer is expected to continue to be enlarged. In accordance with enlargement in the diameter of the semiconductor wafer, it is required to solve various problems including, for example, an increased running cost, an increased amount of a chemical solution and ultra-pure water used for washing the surface of a semiconductor substrate, and an increased amount of waste liquids which must be disposed of. In general, the chemical solution used for the washing of the semiconductor substrate is harmful to the human body, making it necessary to handle the chemical solution very carefully. It is also necessary to dispose of the waste liquid of the chemical solution appropriately so as not to give detrimental effects to the living environment.

In the conventional method of electrolyzing an ultra-pure water, a halogen-containing material such as NaCl is used as a supporting electrolyte. As a result, the halogen is contained in the electrolytic water. It follows that the halogen remains on the semiconductor substrate after washing with the electrolytic water. What should be noted is that the remaining halogen causes problems such as deterioration of an oxide film.

SUMMARY OF THE INVENTION

The present invention, which has been achieved in an attempt to solve the above-noted problems inherent in the prior art, is intended to provide a method and apparatus for forming an electrolytic water from a pure water or an ultra-pure water, and to provide an apparatus for washing a semiconductor substrate by using an electrolytic water-forming apparatus. The method and apparatus of the present invention make it possible to wash a semiconductor substrate without doing damage to the substrate, to decrease the running cost in the washing step of the semiconductor substrate, to make the waste water harmless, and to improve the safety in the working environment.

According to an aspect of the present invention, there is provided a method of forming an electrolytic water, comprising the steps of:

preparing a saturated solution by adding at least one solid supporting electrolyte selected from the group consisting of oxalic acid, ammonium oxalate, ammonium formate, ammonium bicarbonate, and ammonium tartrate to a pure water or an ultra-pure water; and subjecting the saturated solution to electrolysis to obtain an anodic water and a cathodic water.

According to another aspect of the present invention, there is provided an apparatus for forming an electrolytic water, comprising:

a dissolving vessel provided with a layer of at least one solid supporting electrolyte selected from the group consisting of oxalic acid, ammonium oxalate, ammonium formate, ammonium bicarbonate, and ammonium tartrate, a pure water or an ultra-pure water being added to the solid supporting electrolyte to prepare a solution saturated with the supporting electrolyte;

a mixing vessel in which the saturated solution of the supporting electrolyte, which is prepared in the dissolving vessel, is further mixed with a pure water or an ultra-pure water for diluting the saturated solution;

an electrolytic vessel in which the diluted solution is electrolyzed, the electrolytic vessel having an anode chamber and a cathode chamber in which an anodic water and a cathodic water are generated, respectively, as a result of the electrolysis;

a first pipe line for supplying a first pure water or ultra-pure water into the mixing vessel together with the saturated solution withdrawn out of the dissolving vessel; and a second pipe line for supplying a pure water or ultra-pure water into the dissolving vessel through a lower portion of the dissolving vessel.

Further, according to still another embodiment of the present invention, there is provided an apparatus for washing a semiconductor wafer by using an electrolytic water forming apparatus, the washing apparatus comprising:

a dissolving vessel provided with a layer of at least one solid supporting electrolyte selected from the group consisting of oxalic acid, ammonium oxalate, ammonium formate, ammonium bicarbonate, and ammonium tartrate, a pure water or an ultra-pure water being added to the solid supporting electrolyte to prepare a solution saturated with the supporting electrolyte;

a mixing vessel in which the saturated solution of the supporting electrolyte, which is prepared in the dissolving vessel, is further mixed with a pure water or an ultra-pure water for diluting the saturated solution;

an electrolytic vessel in which the diluted solution is electrolyzed, the electrolytic vessel having an anode chamber and a cathode chamber in which an anodic water and a cathodic water are generated, respectively, as a result of the electrolysis;

a first pipe line for supplying a first pure water or ultra-pure water into the mixing vessel together with the saturated solution withdrawn out of the dissolving vessel;

a second pipe line for supplying a pure water or ultra-pure water into the dissolving vessel through a lower portion of the dissolving vessel;

a washing vessel having semiconductor wafers housed therein; and an electrolytic water supply pipe line connecting the electrolytic vessel and the washing vessel.

In the present invention, a halogen-containing substance is not used as a supporting electrolyte in forming an electrolytic water. Naturally, use of the particular electrolytic water for washing a silicon semiconductor substrate permits overcoming the problem inherent in the prior art, i.e., the problem that the halogen remains on the semiconductor substrate after the washing step so as to bring about deterioration of the oxide film formed on the substrate.

BRIEF DESCRIPTION OF THE DRAWINGS

FIG. 1 schematically shows the construction of an apparatus for washing semiconductor substrates by using an electrolytic water-forming apparatus according to one embodiment of the present invention;

FIG. 2 is a graph showing changes in pH value with the hydrolytic time, the graph showing that the hydrolytic water including both the anodic water and cathodic water is obtained as an acidic ionic water in the present invention;

FIG. 3 is a cross sectional view showing in a magnified fashion a dissolving vessel included in the apparatus shown in FIG. 1;

FIG. 4 is a cross sectional view showing in a magnified fashion a mixing vessel included in the apparatus shown in FIG. 1;

FIG. 5 is a graph showing in comparison that the number of particles left on the semiconductor substrate after the washing step differs depending on the method of washing the substrate;

FIG. 6 is a graph showing in comparison that the amounts of metallic impurities left on the semiconductor substrate after the washing step are different depending on the method of washing the substrate; and FIG. 7 is a graph showing in comparison that the amounts of metallic impurities left on a $SiO_2$ layer formed on a surface of the semiconductor substrate after the washing step are different depending on the method of washing the substrate.

DETAILED DESCRIPTION OF THE PREFERRED EMBODIMENTS

Let us describe a system comprising an apparatus 1 for forming an electrolytic water and an apparatus 2 for washing semiconductor substrates according to one embodiment of the present invention with reference to FIG. 1. As shown in the drawing, these apparatuses 1 and 2 are connected to each other via electrolytic water supply lines 15 and 16. A first ultra-pure water supply pipe line 30 and a second ultra-pure water supply pipe line 3 are connected to the electrolytic water-forming apparatus 1 which includes a dissolving vessel 5 having at least one solid supporting electrolyte disposed therein, said solid supporting electrolyte being selected from the group consisting of oxalic acid, ammonium oxalate, ammonium formate, ammonium bicarbonate, and ammonium tartrate. It is basically necessary to use a supporting electrolyte for the electrolysis of the ultra-pure water. A layer 20 of an excessive amount of the solid supporting electrolyte, e.g., oxalic acid, is disposed within the dissolving vessel 5. Since an ultra-pure water is kept supplied to the dissolving vessel 5 through the second ultra-pure supply pipe line 3, a solution 21 saturated with oxalic acid is kept produced within the dissolving vessel 5. As denoted by an arrow, the ultra-pure water is supplied through the pipe 3 into a bottom portion of the dissolving vessel 5 and flows through the oxalic acid layer 20 so as to form the solution 21 saturated with oxalic acid. The saturated solution 21 thus formed is sucked up by a pump 29 into the first ultra-pure water supply pipe line 30 and, then, flows through the pipe 30 together with the ultra-pure water flowing within the pipe 30 into a mixing vessel 6.

The ultra-pure water supplied through the first ultra-pure water supply pipe line 30 is sufficiently mixed with the saturated solution 21 of oxalic acid within the mixing vessel 6 so as to form a diluted oxalic acid solution 28. The dilute solution 28 thus formed is supplied into an electrolytic vessel 7. It should be noted that the mixing vessel 6 also acts as a buffer so as to permit the dilute solution 28 to be supplied constantly at a predetermined rate to the electrolytic vessel 7.

The electrolytic vessel 7 comprises a cathode chamber 22 having a cathode 9 arranged therein and an anode chamber 23 having an anode 10 arranged therein. Each of these electrodes 9 and 10 is formed of platinum or titanium. These cathode chamber 22 and anode chamber 23 are separated from each other by a porous partitioning membrane so as to efficiently separate the cathodic water formed within the cathode chamber 22 from the anodic water formed within the anode chamber 23. As seen from the drawing, the cathode 9 of the electrolytic vessel 7 is connected to a negative electrode 13 of a battery 12, with the anode 10 being connected to a positive electrode 14 of the battery 12.

The power source voltage of the battery 12 is applied to the cathode 9 and the anode 10 to electrolyze the dilute solution 28 of the ultra-pure water supplied to the electrolytic vessel 7. The cathodic water formed on the side of the cathode 9 as a result of the electrolysis exhibits a pH value of 2.79. Likewise, the anodic water formed on the side of the anode 10 exhibits a pH value of 2.60. In other words, the electrolytic water formed on each of the cathode side and anode side exhibits acidity, through the particular electrolytic water exhibits a positive or negative potential. Incidentally, the pH value of the dilute solution 28 before the electrolysis was found to be about 2.60 to 2.63.

On the other hand, in the case of applying electrolysis to the dilute solution containing a conventional supporting electrolyte of ammonium chloride or the ammonium salts specified as the supporting electrolyte in the present invention, hydroxide ions are present in an excessive amount in the cathodic water formed on the side of the cathode, with the result that the cathodic water exhibits an alkalinity. By contraries, protons are present in an excessive amount in the anodic water to cause the anodic water to exhibit an acidity.

FIG. 2 shows changes in the pH value of the electrolytic water relative to the electrolytic time. Curve A1 shown in FIG. 2 covers the anodic water formed by electrolysis applied to the dilute solution 28 of oxalic acid specified as a supporting electrolyte in the present invention, with curve K1 covering the cathodic water formed by the particular electrolysis. On the other hand, curves A2 ad K2 shown in FIG. 2 denote the anodic water and cathodic water, respectively, covering the case where electrolysis was applied to the dilute solution of ammonium oxalate, which is another supporting electrolyte specified in the present invention. In the case of using ammonium oxalate as a supporting electrolyte, the anodic water exhibits an acidity, with the cathodic water exhibiting an alkalinity, as apparent from FIG. 2. In the case of using oxalic acid as a supporting electrolyte, however, each of the anodic water and the cathodic water exhibits an acidity.

To be more specific, since both curves A1 and K1 extend in an acidic region regardless of the hydrolyzing time, an acidic ionic water is withdrawn from each of the cathode chamber 22 and the anode chamber 23 in the case of using oxalic acid as a supporting electrolyte. As a result, the acidic ionic water is supplied uniformly as desired to a metallic film such as a semiconductor wafer so as to perform a desired treatment. Where each of the anodic water and cathodic water is acidic, it is advantageous to use the system for removing particles and for eliminating metallic contaminants or organic contaminants. On the other hand, in the case of using an alkaline salt such as ammonium oxalate as a supporting electrolyte, the cathodic water obtained by the electrolysis is alkaline and, thus, produces excellent effects on the silicon etching and particle removal. In this case, the anodic water is acidic and, thus, is highly effective for eliminating metallic contaminants and organic contaminants, as pointed out above.

The cathodic water formed in the cathode chamber 22 is supplied through a cathodic water supply pipe line 15 into a washing vessel 17 of a washing apparatus 2 for washing semiconductor wafers. Likewise, the anodic water formed in the anode chamber 23 is supplied through an anodic water supply pipe line 16 into the washing vessel 17. As seen from the drawing, the cathodic water and anodic water formed in the electrolytic vessel 7 of the electrolytic water forming apparatus 1 are introduced into the washing vessel 17. Naturally, these cathodic water and anodic water are mixed within the washing vessel 17 so as to have the pH value adjusted.

It should be noted that each of the electrolytic water supply pipe lines 15 and 16 is branched so as to be connected to electrolytic water by-pass lines 81 and 82, respectively. As seen from the drawing, the cathodic water and anodic water are partly brought back into the mixing vessel 6 acting as a buffer through these by-pass lines 81, 82. The flow of these cathodic water and anodic water through the by-pass lines 81, 82 is controlled appropriately by valves mounted in the by-pass lines 81, 82. The electrolytic water thus brought back into the mixing vessel 6 is supplied again into the electrolytic vessel 7 together with the dilute oxalic acid solution 28 of the ultra-pure water, which is to be electrolyzed in the electrolytic vessel 7. When semiconductor substrates 24 are washed within the washing vessel 17 of the washing apparatus 2, it is necessary to use either the cathodic water or the anodic water in view of the pH values of these cathodic water and the anodic water depending on the purpose of washing the semiconductor substrate. In general, the electrolytic water exhibits an oxidizing power or reducing power stronger than that exhibited by the ordinary acidic solution or alkaline solution and, thus, is suitable for elimination of contaminants.

The semiconductor substrates 24 washed by the washing apparatus 2 may be supported either by a batch-type supporting tool or by a single substrate supporting tool. It is desirable to perform the washing of the semiconductor substrate with the electrolytic water for about 5 to 10 minutes whether the electrolytic water used may be alkaline or acidic.

An ultra-pure water supply pipe line 4 is connected to the washing vessel 17 such that the washing vessel 17 is filled with the pure water after washing of the semiconductor substrates 24. The cathodic water and the anodic water used for the substrate washing are discharged through a discharge pipe 18 so as to be stored temporarily in a waste water vessel 19 for neutralization. Finally, the neutralized waste water is discharged to the outside of the system.

The ordinary oxidizing solution is effective for removing only metals having an ionization tendency higher than that of hydrogen. Naturally, it is difficult to remove copper with the ordinary oxidizing solution. However, the anodic water obtained by hydrolysis in the present invention exhibits a high oxidizing power, making it possible to remove copper and organic contaminants. It should also be noted that the hydrogen bonds between water molecules are dissociated by the electrolysis, resulting in decrease in the number of hydrogen bonds. It follows that the aggregate of water molecules (cluster) is diminished so as to decrease the surface tension, with the result that the electrolytic water formed in the present invention is effective for the washing of a silicon substrate having a fine pattern.

In forming an electrolytic water having excellent features as described above, a ferroelectrolyte having a high electrical conductivity is used in many cases in order to promote the reaction for forming the electrolytic water. In general, HCl, NaOH or NaCl is used as such a ferroelectrolyte. It should be noted, however, that these ferroelectrolytes contains a metal or a halogen element which tends to deteriorate the electrical properties of the semiconductor element. Naturally, these ferroelectrolytes must be handled very carefully.

In the present invention, hydrocarbon-based compounds not containing a halogen element are used as the supporting electrolyte. The specific compounds used as the supporting electrolyte in the present invention include, for example, oxalic acid, ammonium oxalate, ammonium formate, ammonium bicarbonate and ammonium tartrate. It is desirable to use the supporting electrolyte in an amount of about 0.001 to 0.1 mol/liter.

FIG. 3 is a cross sectional view schematically showing the construction of a dissolving vessel 5 according to another embodiment of the present invention, the dissolving vessels 5 being included in the electrolytic water-forming apparatus of the present invention. As shown in the drawing, a layer 20 of a solid supporting electrolyte, e.g., an oxalic acid layer, is arranged within the dissolving vessel 5. An inlet port 51 connected to the second ultra-pure water supply pipe line is formed in the bottom portion of the dissolving vessel 5. On the other hand, an outlet port 52 connected to the mixing vessel 6 is formed in the upper wall of the dissolving vessel 5. A temperature sensor 25 is arranged within the dissolving vessel 5 in a manner to be positioned above the oxalic acid layer 20. Further, a stirrer 26 is arranged above the oxalic acid layer 20 for stirring the liquid within the dissolving vessel 5. The oxalic acid layer 20 is immersed in the ultra-pure water introduced into the dissolving vessel 5 through the inlet port 51, with the result that oxalic acid is dissolved in the ultra-pure water until the ultra-pure water is saturated with oxalic acid to form a saturated oxalic acid solution 21. The saturated solution 21 is then supplied through the outlet port 52 into the mixing vessel 6. It should be noted that the amount of oxalic acid contained in the saturated solution differs depending on the temperature of the solution, making it necessary to maintain constant the temperature of the solution within the dissolving vessel 5. Therefore, the temperature within the dissolving vessel 5 is detected by the temperature sensor 25. Further, the stirrer 26 is operated, as desired, so as to keep uniform the concentration and temperature of the solution within the dissolving vessel 5. It is desirable to operate the stirrer 26 for about 30 seconds every 5 minutes.

FIG. 4 is a cross sectional view schematically showing the construction of the mixing vessel 6 according to another embodiment of the present invention, said mixing vessel 6 being included in the electrolytic water-forming apparatus of the present invention. As shown in the drawing, the saturated oxalic acid solution 21 formed in the dissolving vessel 5 and, then, diluted to form a dilute solution 28 as shown in FIG. 1, is introduced into the mixing vessel 6 through an inlet port 61 formed in an upper wall. Then, the dilute solution 28 flows into the electrolytic vessel 7 through an outlet port 64 formed in a lower part of the mixing vessel 6. The mixing vessel 6 is also provided with inlet ports 62 and 63 formed at the bottom. These inlet ports 62 and 63 are connected to the electrolytic water by-pass pipe lines 81 and 82, which are connected to the cathode chamber 22 and the anode chamber 23, respectively, of the electrolytic vessel 7. Further, a resistivity meter 27 is arranged in a predetermined position within the mixing vessel 6. The dilute oxalic acid solution 28 is mixed, as desired, within the mixing vessel 6 with the electrolytic water supplied through the electrolytic water by-pass pipe lines 81, 82. In this case, the resultant solution is supplied as the dilute oxalic acid solution 28 into the electrolytic vessel 7. What should be noted is that the mixing of the electrolytic water introduced through the by-pass pipe lines may cause the oxalic acid concentration of the dilute oxalic acid solution 28 to be changed in some cases. In the embodiment shown in FIG. 4, however, the oxalic acid concentration is detected by the resistivity meter 27 arranged within the mixing vessel 6. Based on the oxalic acid concentration thus detected, a desired value of the oxalic acid concentration is changed, or the conditions for the electrolysis are determined appropriately.

FIGS. 5 to 7, which are graphs each showing the amounts of impurities remaining on a semiconductor substrate after washing of the substrate with the conventional washing solution and with the electrolytic water formed by the electrolytic water-forming apparatus of the present invention, collectively show the prominent effects produced by the present invention. Specifically, FIG. 5 shows the number of particles having a diameter of 0.2 $\mu$m or more, which remained on the surface of the semiconductor substrate after the washing treatment. Treatment A shown in FIG. 5 denotes the conventional treatment with a pure water. As seen from the graph, it is impossible to remove sufficiently the fine particles from the surface of either the silicon semiconductor substrate or the $SiO_2$ film formed on the silicon semiconductor substrate in the case of employing the conventional washing treatment with a pure-water. Treatment (D) shown in FIG. 5 denotes the washing treatment with the alkaline cathodic water such as a dilute ammonium oxalate solution obtained by the method of the present invention. Treatment (B) in FIG. 5 denotes the conventional washing treatment with alkali using a mixture of ammonia, hydrogen peroxide and water ($H_2O$). Further, treatment (C) in FIG. 5 denotes the conventional washing treatment with an alkaline water containing a halogen element. As seen from FIG. 5, it is impossible to remove sufficiently the fine particles by the conventional treatment (B). The conventional method (C) certainly permits removing the fine particles sufficiently. In this case, however, how to deal with the residual halogen remains as an important problem to be solved. On the other hand, treatment (D) using the electrolytic water of the present invention permits sufficiently removing the fine particles from the surface of the silicon semiconductor substrate or from the surface of the silicon dioxide film formed on the silicon substrate.

FIG. 6 shows the metallic impurities, which remained on the surface of the silicon semiconductor substrate after the washing treatment. Treatment A shown in FIG. 6 denotes the conventional treatment with a pure water. As seen from the graph, no significant effect can be obtained in treatment A. On the other hand, the metallic impurities can be removed substantially completely in the conventional treatment (B) using a mixture of HCl, $H_2O_2$, and $H_2O$ and with a dilute hydrofluoric acid (DHF), and in the conventional treatment (C) using a halogen-containing ionic water (or combination of treatment with the conventional acidic water and treatment with a dilute hydrofluoric acid (DHF). Further, treatment (D), which is a combination of the treatment with the acidic water obtained in the present invention and the treatment with DHF, permits further improving the removal of the metallic impurities such that the residual metallic impurities cannot be detected at all. In short, the metallic impurities can be removed completely by the electrolytic acidic water obtained by the method of the present invention. This is exactly the case with the removal of the metallic impurities from a $SiO_2$ film formed on the surface of the semiconductor substrate.

Further, FIG. 7 shows the metallic impurities, which remained on the surface of a $SiO_2$ film formed on the surface of the silicon semiconductor substrate after the washing treatment. Conditions of treatments (A) to (D) shown in FIG. 7 are exactly equal those in FIG. 6. As seen from FIG. 7, it is impossible to remove sufficiently the metallic impurities by the conventional treatment (A) (treatment with pure water). On the other hand, treatment (D) according to the present invention permits removing the metallic impurities more effectively than the conventional treatments (B) and (C).

What is claimed is:

1. A method of forming an electrolytic water, comprising the steps of:

preparing a saturated solution by adding at least one solid supporting electrolyte selected from the group consisting of oxalic acid, ammonium oxalate, ammonium formate, ammonium bicarbonate, and ammonium tartrate to a pure water or an ultra-pure water; and subjecting the saturated solution to electrolysis to obtain an anodic water and a cathodic water.

2. A method of forming an electrolytic water, comprising the steps of:

preparing a saturated solution by adding at least one solid supporting electrolyte selected from the group consisting of oxalic acid, ammonium oxalate, ammonium formate, ammonium bicarbonate, and ammonium tartrate to a pure water or an ultra-pure water;

adding a pure water or ultra-pure water to said saturated solution to prepare a dilute solution; and subjecting the dilute solution to electrolysis to obtain an anodic water and a cathodic water.

3. An apparatus for forming an electrolytic water, comprising:

a dissolving vessel provided with a layer of at least one solid supporting electrolyte selected from the group consisting of oxalic acid, ammonium oxalate, ammonium formate, ammonium bicarbonate, and ammonium tartrate, a pure water or an ultra-pure water being added to said solid supporting electrolyte to prepare a solution saturated with said supporting electrolyte;

a mixing vessel in which said saturated solution of the supporting electrolyte, which is prepared in said dissolving vessel, is further mixed with a pure water or an ultra-pure water for diluting the saturated solution;

an electrolytic vessel in which said diluted solution is electrolyzed, said electrolytic vessel having an anode chamber and a cathode chamber in which an anodic water and a cathodic water are generated, respectively, as a result of the electrolysis;

a first pipe line for supplying a first pure water or ultra-pure water into said mixing vessel together with the saturated solution withdrawn out of said dissolving vessel; and a second pipe line for supplying a pure water or ultra-pure water into said dissolving vessel through a lower portion of said dissolving vessel.

4. The electrolytic water-forming apparatus according to claim 3, wherein a temperature sensor and a stirrer for stirring the saturated solution are arranged within said dissolving vessel.

5. The electrolytic water-forming apparatus according to claim 3, wherein a resistivity meter for detecting the concentration of the dilute solution within the mixing vessel is arranged within the mixing vessel.

6. An apparatus for washing a semiconductor wafer by using an electrolytic water forming apparatus, said washing apparatus comprising:

a dissolving vessel provided with a layer of at least one solid supporting electrolyte selected from the group consisting of oxalic acid, ammonium oxalate, ammonium formate, ammonium bicarbonate, and ammonium tartrate, a pure water or an ultra-pure water being added to said solid supporting electrolyte to prepare a solution saturated with said supporting electrolyte;

a mixing vessel in which said saturated solution of the supporting electrolyte, which is prepared in said dissolving vessel, is further mixed with a pure water or an ultra-pure water for diluting the saturated solution;

an electrolytic vessel in which said diluted solution is electrolyzed, said electrolytic vessel having an anode chamber and a cathode chamber in which an anodic water and a cathodic water are generated, respectively, as a result of the electrolysis;

a first pipe line for supplying a first pure water or ultra-pure water into said mixing vessel together with the saturated solution withdrawn out of said dissolving vessel;

a second pipe line for supplying a pure water or ultra-pure water into said dissolving vessel through a lower portion of said dissolving vessel;

a washing vessel having semiconductor wafers housed therein; and an electrolytic water supply pipe line connecting said electrolytic vessel and said washing vessel.

7. The apparatus according to claim 6, wherein said washing vessel comprises a waste water vessel in which the electrolytic water used for washing semiconductor wafers is recovered and neutralized for discharge to the outside.

8. The apparatus according to claim 6, wherein said electrolytic water supply pipe line further comprises by-pass lines connected to said mixing vessel.

* * * * *